United States Patent [19]

Brueggemann et al.

[11] 4,311,751

[45] Jan. 19, 1982

[54] MOLDABLE SOUND CONTROL COMPOSITE AND PRODUCT

[75] Inventors: Walter H. Brueggemann, Chagrin Falls, Ohio; Charles L. Meteer, Bridgeport, Conn.

[73] Assignee: Ferro Corporation, Cleveland, Ohio

[21] Appl. No.: 114,118

[22] Filed: Jan. 21, 1980

Related U.S. Application Data

[62] Division of Ser. No. 690,796, May 27, 1976, Pat. No. 4,237,176.

[51] Int. Cl.$^3$ .......................... C08L 63/00; C04B 43/00
[52] U.S. Cl. ..................... 428/212; 428/219; 428/413; 428/523; 260/DIG. 46; 525/122; 252/62; 181/294
[58] Field of Search ............... 181/290, 294; 525/122; 428/212, 413, 219, 500, 523; 252/62; 260/DIG. 46

[56] References Cited

U.S. PATENT DOCUMENTS

| | | | |
|---|---|---|---|
| 3,041,195 | 6/1962 | Saewert et al. | 428/413 X |
| 3,170,887 | 2/1965 | Ramos | 260/DIG. 46 X |
| 3,217,832 | 11/1965 | Whitney | 181/294 |
| 3,392,045 | 7/1968 | Holub | 525/122 X |
| 3,410,374 | 11/1968 | Haupt | 260/830 P |
| 3,418,201 | 12/1968 | Bowman | 428/413 |
| 3,424,270 | 1/1969 | Hartman et al. | 181/290 |
| 3,565,834 | 2/1971 | Dachs et al. | 260/830 P |
| 3,644,222 | 2/1972 | Fleming | 102/103 X |
| 3,658,635 | 4/1972 | Eustice | 181/290 X |
| 3,763,088 | 10/1973 | Izawa et al. | 260/37 EP |
| 3,904,456 | 9/1975 | Schwartz | 428/461 X |

FOREIGN PATENT DOCUMENTS

884573 12/1961 United Kingdom .

*Primary Examiner*—George F. Lesmes
*Assistant Examiner*—Alexander S. Thomas
*Attorney, Agent, or Firm*—Wilson, Fraser, Barker & Clemens

[57] ABSTRACT

A moldable sound control composite is disclosed combining in itself when molded damping, barrier performance, and structural strength for use within a predetermined environment temperature range. As such, the moldable composite is not applied to other structures to damp their sound generation, but forms by itself a complete structural member having not only desirable sound reducing properties but desirable strength properties as well. The composite comprises a blend of a primary non-viscoelastic organic polymeric resinous material intended to impart structural strength to the composite, a secondary viscoelastic organic polymeric resinous material to provide damping performance, and filler material adapted to densify the composite and impart barrier performance. Optionally, at least one of the primary and secondary resinous materials may be thermosetting. By virtue of the blend of all of these ingredients, the molded composite has a glass transitional temperature range generally corresponding to the predetermined environmental temperature range for which the composite is designed for use and a maximum loss factor, n, falling within that range.

1 Claim, 3 Drawing Figures

TYPICAL STRESS-STRAIN DIAGRAM FOR A VISCOELASTIC MATERIAL

TYPICAL STRESS-STRAIN DIAGRAM FOR A NON-VISCO-ELASTIC MATERIAL

LOSS FACTOR OVER CHANGING TEMPERATURE FOR SOUND CONTROL COMPOSITE

MOLDABLE SOUND CONTROL COMPOSITE AND PRODUCT

CROSS-REFERENCE TO RELATED APPLICATION

This application is a division of an application, Ser. No. 690,796, filed May 27, 1976 now U.S. Pat. No. 4,237,176.

BACKGROUND OF THE INVENTION

Noise as undesirable sound both in frequency and intensity has long plagued living and working environments. Actually, the elimination or reduction of sound can be quite complex. Several techniques have been employed such as redesigning or altering noise source, absorbing the sound by suitable materials, damping the sound by the use of sound-energy reducing materials, attenuating the sound by introducing barriers to sound transmission, and removing the source of the sound from the region affected. Of these, damping is probably the least understood and requires careful definition of the sound problem and the environment of use.

Viscoelastic materials are normally effective for sound damping. By definition, viscoelastic materials have a nonlinear response to stress. The graphic representation of the stress-strain relation of a viscoelastic material is a hysteresis loop in contrast with the straight line stress-strain response of a non-viscoelastic material. Viscoelastic materials are effective for damping because they can convert the cyclic kinetic energy of sound into other forms of energy, usually heat; note "Damping of sound energy with polymer systems", by W. H. Brueggemann, *Modern Plastics,* October, 1972, page 92.

However, the very fact that viscoelastic materials readily undergo damping vibration, ill equips such materials for structural applications. The damping response varies throughout a wide range of sound levels for different viscoelastic materials (reflected by the width of the hysteresis loop), such that the materials have poor dimensional stability and tend in time to creep. As a result, the practice has been to apply a viscoelastic material as a cover or coat to a structural member to reduce sound generated by it, much as one would paint such a member. This use has not always been satisfactory, however, for the coating of viscoelastic material tends to crack or flake off or otherwise become inoperative.

A commonly used measure of damping effect is "loss factor". When stress and strain are out of phase with respect to time, Young's modulus of the material is a complex quantity. The equation expressing this is:

$$E^* = E_1 + iE_2$$

where $E^*$ is the complex modulus, $E_1$ and $E_2$ are the elastic modulus and loss modulus, respectively, and $i$ is the square root of minus one. The ratio $E_2/E_1$ is defined as the loss factor, n. The larger the magnitude of loss factor, the more effective is the damping material.

Temperature greatly affects the loss factor of a viscoelastic material. The loss factor increases and passes through a maximum as the temperature increases. When loss factor is plotted against temperature, a temperature range normally occurs in which the material has optimum damping characteristics and which is termed the glass transitional range. The temperature at which this range begins is termed the glass transitional temperature and is designated, Tg.

SUMMARY OF THE INVENTION

The present invention relates to a moldable composite useful when molded as a sound control medium characterized in that the composite is not applied as such to something else but by itself forms a complete structural member having both desirable sound reducing properties and desirable strength or structural properties as well. As molded, the composite combines desirable values of the loss factor, n, and the glass transitional temperature range to provide excellent performance. The glass transitional temperature range generally corresponds to a predetermined environmental temperature range at which the composite is designated to be used. This is accomplished by a proper and selective blend of non-viscoelastic and viscoelastic organic resinous materials together with a filler material adapted to densify and impart barrier performance to the composite.

More particularly, the present sound control composite when molded uniquely combines three of the five known techniques for reducing or eliminating sound, namely, the joint use of (a) a barrier in the path of the sound which is (b) adapted to damp the sound, and (c) adapted to redesign or alter the source of the sound for a given temperature range of application.

These and other objects are realized by a composite adapted for use within a predetermined environmental temperature range comprising a blend of materials which en masse combine damping, barrier performance, and structural strength. The composite includes a primary non-viscoelastic organic polymeric resinous material to impart structural strength, a secondary viscoelastic organic resinous polymeric material to provide damping performance, and filler material to densify the composite and impart barrier performance, the molded composite having by virtue of the blend a glass transitional range generally corresponding to a predetermined environmental range at which the composite is to be primarily used and a maximum loss factor, n, falling within that range.

A vast number of organic polymeric resinous materials may be used either as the primary non-viscoelastic material or the secondary viscoelastic material. The presence or absence of viscoelasticity is a key factor in choosing a particular material for either role is dependent upon the transitional temperature range of that material. Preferably, at least one of the primary or secondary organic resinous polymeric materials is thermosetting as an aid to achieving structural strength and dimensional stability. Where the environmental temperature range of application is relatively high, that is, above the softening points of thermoplastic polymeric materials, both the primary and secondary resinous polymeric materials of the blend should be thermosetting.

The filler material of the present composite is also important. This component densifies the composite and principally contributes the barrier performance to the composite as one of the techniques of sound reduction. Fillers may also offset shrinkage and improve toughness and hardness. Filler materials may also augment damping ability of the composite and may be present in different forms, such as platelets, amorphous particles, fibers, or combinations of these. Examples of these three forms include mica, quartz, and glass fibers, respectively.

DESCRIPTION OF THE PREFERRED EMBODIMENTS

Inasmuch as a cardinal consideration of the present composite is one of physical properties, and particularly the conjoint use of viscoelastic and non-viscoelastic materials, a somewhat detailed analysis of what these terms mean in the present context is submitted with reference to the figures.

Figure 1:
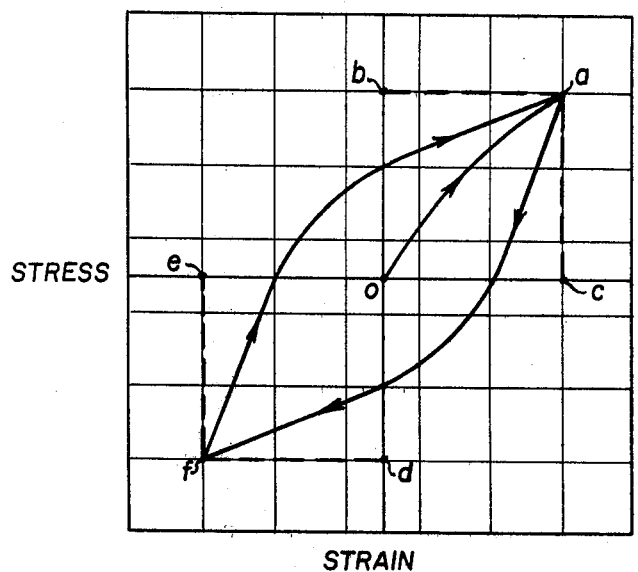
FIG. 1 is a graph of a stress-strain hysteresis loop response for a viscoelastic material.

Both viscoelastic and non-viscoelastic materials resist vibratory motion induced by sound waves, but their responses are quite different. When a viscoelastic material is stressed, its viscoelastic properties cause it to resist the motion as shown in FIG. 1. As the viscoelastic material is loaded from o to a by stress b, a strain c occurs. In a cyclic loading mode, such as is experienced under vibratory motion, the unloading path does not follow the original path but describes a further path from stress b to stress d. The strain for stress d is indicated at e, the stress-strain point at this juncture being indicated at f. Completing the full frequency cycle, the second unloading path is again different from the first in returning to a. This phenomenon associated with viscoelastic materials is called hysteresis, and the area of the loop is a measure of the amount of damping that has taken place.

Figure 2:
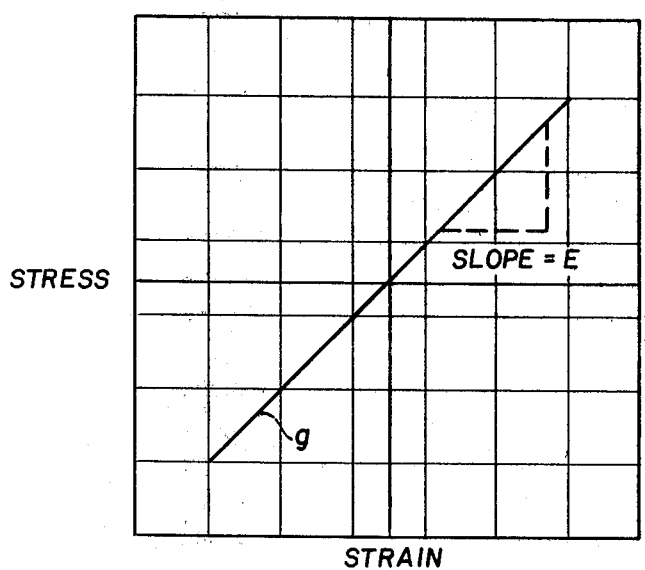
FIG. 2 is a graph of a stress-strain straight line response of a non-viscoelastic material.

In a similar manner, FIG. 2 illustrates the linear response of a non-viscoelastic material under a stress-strain relation. In this case, although the material yields under a vibratory motion, as soon as the disruptive force is removed, the non-viscoelastic material immediately returns to its original shape and size. This stress-strain relation is, accordingly, illustrated by the straight line g in which the slope of the line is equal to E, Young's modulus of the material. In accordance with the present invention, a blend of viscoelastic and non-viscoelastic materials plus a reinforcing and densifying filler material is made, such that the resulting composite when molded has the properties illustrated by the graph of FIG. 3. In this figure, in which temperature is plotted against loss factor, n, (previously defined), the temperature passes through three temperature ranges, namely, a glassy range, a transitional range, and a rubbery range. The symbol, Tg, is the temperature at the start of the transitional range and is termed the glass transitional point temperature.

Figure 3:
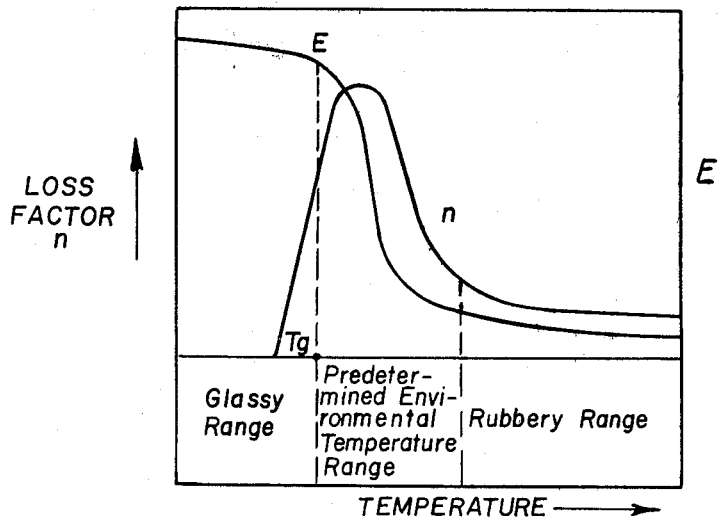
FIG. 3 is a graph of the loss factor, n, against temperature of a present molded composite and shows a transitional temperature range.

In carrying out the present invention, the properties of the composite are judiciously chosen that the intermediate transitional temperature range substantially matches that of the predetermined environmental temperature range in which the composite is designed to be used. It should be noted that the loss factor, n, has its highest value within this temperature range. In contrast, the glassy and rubbery temperature ranges of the composite do not provide effective damping performance. FIG. 3 shows the modulus, E, of the material over the three temperature ranges.

In the case where both viscoelastic and non-viscoelastic components of the composite are thermoplastic, the properties of the composite as illustrated by FIG. 3 are the same for both the moldable composite and the resulting molded product. However, where the composite contains an appreciable amount of a thermosetting component, its properties, as illustrated by FIG. 3, are for the molded composite product only. It is preferred that at least one of the viscoelastic and non-viscoelastic materials be thermosetting.

It is not possible to characterize a given material permanently and under all conditions as either viscoelastic or non-viscoelastic, because temperature of application or use plays such a large role in determining this property. Most brittle, stiff materials normally non-viscoelastic, become viscoelastic at certain temperature ranges. A classic example of this is ordinary glass. At room temperatures, glass is hard, unyielding, brittle and non-viscoelastic. But at temperatures below but near its softening temperature, glass is soft, deformable, plastic and viscoelastic.

Since the viscoelastic and non-viscoelastic components of the present composite may be either thermoplastic or thermosetting, examples of each are given, the ultimate choice for a blend to be determined primarily by temperature considerations as herein disclosed. Useful thermoplastic organic polymeric resinous materials include polyacrylic acid, polyacrylic esters, polymethacrylic acid, polymethacrylic esters, polyvinyl acetate, polyvinyl butyral, polyvinyl alcohol, polyvinyl chloride, polyvinylidene chloride, nitrocellulose, cellulose acetate, ethyl cellulose, polyethylene, polypropylene, polystyrene, nylon, linear polyurethanes, polytetrafluorethylene, linear polyesters, polyvinyl carbazole, and acrylonitrile butadiene styrene polymers.

Useful thermosetting organic polymeric resinous materials include phenol-formaldehyde, urea-formaldehyde, epoxy resins, melamine formaldehyde, phenol furfural, cross-linked polyester resins, silicones, cross-linked polyurethanes, and elastomers such as butadiene-styrene, butadiene-acrylonitrile, butyl rubbers, polysulfides, neoprene, and polyisobutylene.

As used herein, the term "thermoset" and forms thereof are taken to mean organic polymeric resinous materials which irreversibly convert to a hardened form. Normally, this is accomplished by the application of heat, but this need not be necessary. Thermosetting materials can be converted to the hardened form at room temperature by the incorporation of catalysts, such as free-radical catalysts, and by other techniques known in the art.

The filler material used in forming a composite of the present invention also plays a key role in developing the end product and further contributes to the value of loss factor obtained. It is within the contemplation of the present invention to use two or more different types of filler materials, each filler material being picked to perform a desired function as hereinafter described.

There are three general types of filler materials which can be used to augment the damping ability of the composite, namely, platelets, amorphous particles, and fibers. In the case of amorphous particles, such as quartz, barytes, and lead powder applied stress in the form of vibration causes the filled system to vibrate. Stresses in the composite are distributed between the polymer matrix and the filler particles. At the interface region of a filler particle, a portion of the stress is shear and the strain resulting from the stress is again out of phase.

Such out of phase response due to shear produces enhanced damping. Multiplied many times by the presence of many particles, the overall damping of a filled resin system is improved by fillers.

Platelet fillers further enhance the phenomena above by exposing a more uniformly flat surface to the shear stresses imposed. For this case the majority of stress is shear. Fibrous fillers also do provide surfaces for shear stress transfer. In addition, fibers can also contribute stiffness and strength to a composite. Damping is additionally improved because stiffness resists vibration and increases shear stress about the fiber.

The most effective filler material in terms of damping behavior is dense amorphous particles. Not only does the weight of the particles amplify energy dissipation due to particle movement, but the increased mass of the material alters the stiffness-to-mass ratio of the vibrating material. Fibrous fillers and platelet fillers provide about equal damping performance, although the amount of fibrous filler material required is usually smaller. Fibrous potassium titanate in epoxy-based resinous materials is quite effective filler material as are graphite and carbon black. Platelet filler materials, such as mica or graphite also provide good damping performance. As a rule, small particle fillers are more effective than large particle fillers, since the larger number of particles per unit weight generate more shear stress. Clay fillers, such as kaolin harden viscoelastic resinous polymers. When particles are used as the filler material, they may be ground to a size passing 150 mesh but retained on 250 mesh, U.S. Standard Sieve. Barytes is often used in conjunction with other filler materials for viscoelastic systems. Platelet fillers, such as mica and graphite, or fibrous filler, such as carbon and glass fibers, are further used as reinforcing agents to improve the modulus of the composite.

Other filler materials can be used in addition to those names, such as asbestos, fibers of resinous materials, various clays, alumina trihydrate, calcium carbonate, and the like.

To prepare the present composite, the viscoelastic, non-viscoelastic and filler materials are blended by any suitable means, such as by a Waring blender. When the materials are thermoplastic, they may be used in hot melt form. When the materials are thermosetting, they are used in the A stage of polymerization. Alternatively, the resinous materials may be dissolved or suspended in known organic inert solvents or liquids for this purpose, such as alcohols, including glycols, ketones, aromatic liquids and the like. The nature of the solvent or other liquid used is not critical as long as it is chemically inert to the components of the composite, since the solvent is ultimately removed in any event, usually by evaporation. Curing agents, surfactants, mixing aids and the like can also be incorporated in effective amounts in the mix forming the composite.

While proportions of the components and density of the composite may range widely, in most cases a molded composite comprises from about 10% to about 60% by weight of the primary non-viscoelastic material, from about 40% to about 90% of the secondary viscoelastic material, and from about 10% to about 60% of the filler material, it of course being understood that relative amounts are used to total 100 percent. The specific gravity of the composite is usually within the range of about 1.0 to about 7.0.

As indicated, a proper choice of the three basic materials is made so as to impart viscoelasticity to the composite in the predetermined environmental temperature range in which the composite is to perform, while insuring at the same time proper structural strength, barrier performance, density, and the like of the composite. This is achieved for the purpose that the composite can be molded as one, integral structural piece, as compared to coating or troweling the composite onto another structural member. The predetermined environmental temperature range generally matches the transitional temperature range of the viscoelastic properties of the composite. As a rule, an operable temperature range within which the present composite may be used extends from 65° F. (room temperature) to 400° F. and even higher. For example, at temperatures above 800° F. to as high as 1300° F. and higher, composites containing glass enamels as coatings have demonstrated suitable behavior in accordance with the present invention.

A proper blend of the three basic materials, viscoelastic, non-viscoelastic and filler materials, can be easily determined by trial and error techniques for any individual application. However, as a guide in selecting proper components, Table A lists 12 types of thermoplastic materials which can be used as the viscoelastic organic resinous polymeric material of the present composite together with the values of $T_g$ in degrees centigrade for these materials. While molecular weight of a polymer affects the $T_g$, the values of $T_g$ given in Table A correspond generally to the molecular weights normally present in these materials as commercially purchased. Also, while the given values of $T_g$ are for individual polymers, the resulting effect on a given, otherwise uniform composite can be gauged by comparing the $T_g$ values for the different polymers.

TABLE A

| POLYMER | REPEATING UNIT | $T_g$ °C. |
|---|---|---|
| (1) Polyethylene | $-CH_2-$ | $-120$ |
| (2) Polyacrylic acid | H H<br>\| \|<br>C C<br>\| \|<br>H C—OH<br>‖<br>O | $+106$ |
| (3) Polystyrene | H H<br>\| \|<br>—C—C—<br>\|<br>H (phenyl) | $+100$ |
| (4) Polypropylene | H CH$_3$<br>\| \|<br>—C—C—<br>\| \|<br>H H | $-10$ |
| (5) Poly-4-methyl-penetene-1 | H CH$_2$—CH(CH$_3$)$_2$<br>\| \|<br>—C—C—<br>\| \|<br>H H | $+29$ |
| (6) Polyvinyl carbazole | (carbazole ring)<br>N<br>H \|<br>\| <br>—C—C—<br>\| \|<br>H H | $+208$ |
| (7) Polyvinyl alcohol | H H<br>\| \|<br>—C—C—<br>\| \|<br>H—O H | 85 |

TABLE A-continued

| POLYMER | REPEATING UNIT | Tg °C. |
|---|---|---|
| (8) Polyvinyl chloride | H H<br>\| \|<br>—C—C—<br>\| \|<br>Cl H | 87 |
| (9) Polyvinylidene chloride | Cl H<br>\| \|<br>—C—C—<br>\| \|<br>Cl H | −17 |
| (10) Polyvinyl acetate | H H<br>\| \|<br>—C—C—<br>\| \|<br>H O—C—CH$_3$<br>      ‖<br>      O | 29 |
| (11) Acrylates | H H<br>\| \|<br>—C—C—<br>\| \|<br>H C—OR<br>   ‖<br>   O | |
| | R = Methyl | +3 |
| | Ethyl | −22 |
| | n-propyl | −44 |
| | n-butyl | −56 |
| (12) Methacrylates | H CH$_3$<br>\| \|<br>—C—C—<br>\| \|<br>H C—OR<br>   ‖<br>   O | |
| | R = Methyl | +120 |
| | Ethyl | +65 |
| | n-propyl | +35 |
| | N-butyl | +21 |

As further illustrations, with a non-viscoelastic crosslinked polyester resin, suitable viscoelastic materials can be used such as linear, long chain polyester resins, polyethylene, polystyrene and elastomers; with a non-viscoelastic epoxy resin, suitable viscoelastic materials can be used such as nylon, polyamines, polyethylene, polystyrene, and elastomers; with a non-viscoelastic phenolic resin like phenol-formaldehyde, suitable viscoelastic materials can be used such as epoxy resins, polyethylene, polystyrene, and elastomers.

After a composite blend is prepared, it may be molded into a one-piece structure by any conventional molding technique, such as injection molding, transfer casting, press molding and the like. This is in sharp contrast to prior techniques in which a sound control material was troweled onto or pasted against a workpiece whose sound intensity was to be reduced. Instead, the present invention forms a structural member directly and entirely from the composite itself. The composite can be used in this manner for forming fan housings, auto body parts, appliance housings, shower stalls, entire ducts, piping, and the like.

The following examples are intended only to illustrate the invention and should not be construed as imposing limitations on the claims. The examples are of sound control composites ready to be molded into any desired shape forming complete structural members by themselves as contrasted to being applied to a substrate. Examples 1 through 3 are thermosetting-based composites in which the thermosetting component is not fully cured, although it may be partially cured. After these composites are molded, they are conventionally advanced to a final state of cure as by application of heat. Examples 4 through 9 are thermoplastic-based composites. They are conventionally molded by heating to fuse the composite, shaped as desired, and then cooled. The loss factor, n, is the value at room temperature unless otherwise stated. The viscoelastic and non-viscoelastic materials for each example are also designated.

EXAMPLE 1

Epoxy-based Composite

| | Weight % |
|---|---|
| *Polyamide Epoxy Hardener (Amine equivalent 350–400) | 16.5 |
| **Epoxy Resin (Bisphenol A-Epichlorohydrin) | 4.9 |
| Diethylene Triamine | 0.8 |
| Quartz Sand (−200 mesh) Filler | 61.4 |
| Antimony Oxide | 2.5 |
| Chloridinated Wax or Paraffin | 6.8 |
| Polyethylene glycol Thickener | 7.2 |
| | 100.1 |
| Transitional Temperature Range | −10° C. to 70° C. |
| Specific Gravity | 1.7 |
| Loss Factor | 0.56 |

*Viscoelastic Material
**Non-viscoelastic Material

EXAMPLE 2

Epoxy-based Composite

| | Weight % |
|---|---|
| **Epoxy Resin (Bisphenol A-Epichlorohydrin) | 10.6 |
| *Polyamide Epoxy Hardener | 15.4 |
| Ethyl glycol ether Solvent | 3.6 |
| Quartz Sand (−200 mesh) Filler | 67.6 |
| Silica Thickener | 1.9 |
| Diethylene Triamine | 0.9 |
| | 100.0 |
| Transitional Temperature Range | 0° C. to 80° C. |
| Specific Gravity | 2.0 |

| Loss Factor, n | |
|---|---|
| °F. | n |
| 75 | 0.38 |
| 100 | 0.68 |
| 125 | 0.31 |
| 150 | 0.23 |
| 175 | 0.19 |

*Viscoelastic Material
**Non-viscoelastic Material

EXAMPLE 3

Epoxy-based Composite

| | Weight % |
|---|---|
| **Epoxy Resin (Bisphenol A-Epichlorohydrin) | 16.4 |
| *Polyamide Epoxy Hardener | 23.6 |
| Quartz Sand (−400) Filler | 52.3 |
| Silica Thickener | 2.0 |
| Ethylene glycol ether Solvent | 4.4 |
| Diethylene Triamine | 1.3 |
| | 100.0 |
| Transitional Temperature Range | 24° C. to 100° C. |
| Specific Gravity | 1.9 |

| Loss Factor, n | |
|---|---|
| °F. | n |
| 75 | 0.18 |
| 100 | 0.36 |
| 125 | 0.55 |
| 150 | 0.70 |

-continued

| | |
|---|---|
| 175 | 0.25 |

*Viscoelastic Material
**Non-viscoelastic Material

EXAMPLE 4

Polyester-based Composite

| | Weight % |
|---|---|
| **Rigid isophthalic-neopentaglycol Polyester | 21.65 |
| *Flexible isophthalic-ethylene glycol Polyester Resin | 21.65 |
| Alumina Trihydrate Filler | 39.0 |
| Silica Thickener | 1.3 |
| Mica Filler | 4.3 |
| Cobalt Octoate Promoter | 0.9 |
| Styrene Diluent | 11.2 |
| | 100.0 |

*Viscoelastic Material
**Non-viscoelastic Material

The above composition was spread over and laminated with a glass fiber mat in which the mat also served as a filler material. The laminate consisted by weight of 80% of the composite and 20% of the mat and had these properties.

| | |
|---|---|
| Transitional Temperature Range | 20° C. to 150° C. |
| Specific Gravity | 1.5 |
| Loss Factor | 0.052 |
| Barcol Hardness | 45 |
| Impact Strength (in-lbs.) | 25 |

EXAMPLE 5

Polyolefin-based Composite

| | Weight % |
|---|---|
| **Polyethylene | 55.0 |
| *Polyisobutylene | 16.6 |
| Mica Filler | 5.6 |
| Carbon Black | 11.1 |
| Antioxidant (amines) | 0.6 |
| Fiberglass Reinforcement | 11.1 |
| | 100.0 |
| Glass Transition Range | −10° C. to 50° C. |
| Specific Gravity | 1.3 |
| Loss Factor | 0.2 |

*Viscoelastic Material
**Non-viscoelastic Material

EXAMPLE 6

Polystyrene-based Composite

| | Weight % |
|---|---|
| **Polystyrene | 55 |
| *Acrylic Rubber | 15 |
| Mica Filler | 9 |
| Light/Heat Stabilizers | 1 |
| Fiberglass Reinforcement | 20 |
| | 100 |
| Glass Transition Range | 0° C. to 100° C. |
| Specific Gravity | 1.5 |
| Loss Factor | 0.1 |

*Viscoelastic Material
**Non-viscoelastic Material

The light and heat stabilizers may be any of those known in the art for polystyrene.

EXAMPLE 7

Polyvinyl chloride-based Composite

| | Weight % |
|---|---|
| **Polyvinyl Chloride | 61 |
| *Polyacrylic Acid | 6 |
| Mica Filler | 6 |
| Light Stabilizer | 1 |
| Plasticizer | 6 |
| Fiberglass Reinforcement | 20 |
| | 100 |
| Glass Transition Range | 50° C. to 160° C. |
| Specific Gravity | 1.7 |
| Loss Factor | 0.06 |

*Viscoelastic Material
**Non-viscoelastic Material

The light stabilizer and plasticizer may be any of those known in the art for polyvinyl chloride.

EXAMPLE 8

Polyamide-based Composite

| | Weight % |
|---|---|
| **Polyamide (Nylon 6) | 69 |
| *Polyamide/Polyamine Copolymer | 5 |
| Mica Filler | 6 |
| Fiberglass Reinforcement | 20 |
| | 100 |
| Glass Transition Range | 40° C. to 60° C. |
| Specific Gravity | 1.5 |
| Loss Factor | 0.04 |

*Viscoelastic Material
**Non-viscoelastic Material

EXAMPLE 9

Polymethacrylate-based Composite

| | Weight % |
|---|---|
| **Polymethyl methacrylate | 55 |
| *Polymethylacrylate | 18 |
| Mica Filler | 6 |
| Heat Stabilizer | 1 |
| Fiberglass Reinforcement | 20 |
| | 100 |
| Glass Transition Range | 20° C. to 130° C. |
| Specific Gravity | 1.5 |
| Loss Factor | 0.05 |

*Viscoelastic Material
**Non-viscoelastic Material

The heat stabilizer may be any of those known in the art for the polyacrylate resins.

While in the foregoing examples different materials have been indicated as the viscoelastic and non-viscoelastic materials, and this is the preferred practice, it is understood that it is possible for one material to serve both functions. This is true where the material is not a precise chemical compound, but one which is a blend of different segments or portions of generically the same polymeric resinous material and in which such different segments have different polymeric growths. Accordingly, the segments have different sound response characteristics and, for a given predetermined temperature range, one segment may serve as a viscoelastic material and another segment may serve as a non-viscoelastic material, even though both segments may have their genesis in the same monomer. Specific examples of materials which can be utilized in this manner are flexible polyester resins made from isophthalic acid and ethylene glycol and the various known polyvinyl acetate copolymers like copolymers of polyvinyl acetate with polyvinyl chloride or polyvinyl butyral.

Although the foregoing describes several embodiments of the present invention, it is understood that the invention may be practiced in still other forms within the scope of the following claims.

We claim:

1. A moldable sound control composite adapted to form a molded structural article by itself, free of any accompanying support, and combining damping, barrier performance, and structural strength, said composite being further adapted for use within a predetermined environmental temperature range, said composite in weight percent a blend of from about 10% to about 60% of a primary organic polymeric resinous material that is non-viscoelastic within said temperature range to impart a structural strength, from about 40% to about 90% of a secondary organic resinous polymeric material that is viscoelastic within said temperature range to provide damping performance, and from about 10% to about 60% of a filler material adapted to densify the composite and impart barrier performance, said composite having a specific gravity within the range of about 1.0 to about 7.0 and, by virtue of said blend, a glass transitional temperature range generally corresponding to said predetermined environmental temperature range and a maximum loss factor, n, falling within said environmental range, and in which said primary non-viscoelastic organic resinous material is Bisphenol A-epichlorohydrin epoxy resin, and said secondary viscoelastic organic resinous material is polyethylene.

* * * * *